United States Patent
Jenett

[11] Patent Number: 6,014,724
[45] Date of Patent: *Jan. 11, 2000

[54] FLASH TRANSLATION LAYER BLOCK INDICATION MAP REVISION SYSTEM AND METHOD

[75] Inventor: Detlef Jenett, Erfurt, Germany

[73] Assignee: SCM Microsystems (U.S.) Inc., Los Gatos, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/710,463

[22] Filed: Sep. 17, 1996

Related U.S. Application Data

[62] Division of application No. 08/549,031, Oct. 27, 1995, abandoned.

[51] Int. Cl.[7] .................................................. G06F 12/00
[52] U.S. Cl. ........................................... 711/103; 711/202
[58] Field of Search ..................... 395/412, 442, 395/430, 481; 711/202, 115, 103, 154

[56] References Cited

U.S. PATENT DOCUMENTS

| | | | |
|---|---|---|---|
| 5,337,275 | 8/1994 | Garner | 365/189.01 |
| 5,404,485 | 4/1995 | Ban | 395/425 |
| 5,592,669 | 1/1997 | Robinson et al. | 395/622 |
| 5,598,370 | 1/1997 | Niijima et al. | 365/185.33 |
| 5,602,987 | 2/1997 | Harari et al. | 395/182.06 |
| 5,630,093 | 5/1997 | Holzhammer et al. | 395/442 |
| 5,634,050 | 5/1997 | Krueger | 395/616 |
| 5,682,497 | 10/1997 | Robinson | 395/430 |

*Primary Examiner*—John W. Cabeca
*Assistant Examiner*—Kevin Verbrugge
*Attorney, Agent, or Firm*—Sabath & Truong

[57] ABSTRACT

A system and method of avoiding preservation of files deleted in a flash memory by indicating deletion in a File Indication Map without modifying an associated block allocation map controls transfer of files from a full flash memory erase unit to a transfer flash memory erase unit. Modified File Indication Maps are compared with prior File Indication Maps to establish file deletion and to control modification of an associated block allocation map. The prior File Indication Map in flash memory is updated after comparison is completed.

22 Claims, 5 Drawing Sheets

FLASH TRANSLATION LAYER BLOCK INDICATION MAP REVISION SYSTEM AND METHOD

This is a Division, of application Ser. No. 08/549,031 filed on Oct. 27, 1995, now abandoned.

This application is related to another patent application Ser. No. 08/549,476 filed on Oct. 27, 1995 under the title, Flash Translation Layer Cleanup System and Method, which is hereby expressly referenced and incorporated herein in its entirety.

1. Technical Field of the Invention

This invention relates to systems and methods for interfacing flash memory cards and personal computers, and more particularly to methods and systems for making revisions and updates in the block allocation map of the flash translation layer of a computer flash system, to ensure that deleted files are not preserved during clean-up, because of continued misdesignation of the files in the block allocation map as valid long after they have been deleted in the File Indication Map (FIM) resident in flash memory.

2. Background

Computers, including but not limited to personal computers (PCs) and personal digital assistants (PDAs), use operating systems having predetermined file structures. The file structures are adapted for interfacing with mechanical drives (e.g., hard drives and floppy drives). In such mechanical drive memory locations, data can typically be written directly Dover other data designated for deletion. The PC file system tracks the status of particular memory locations to which files are written, to determine whether the memory locations are available for being overwritten. In particular, the file structure includes a block allocation map which tracks the blocks allocated to store particular files. Flash memory card arrays and media, on the other hand, are configured in erase blocks. An erase block must be completely erased before any new data can be written into its memory locations.

A file management system is related to a memory location on a disk through a File Indication Map (FIM). In operation, when the operating system reads or writes to or from a disk, the disk addresses are used by the operating system file management system to direct specific data to an intended storage location. The FIM can refer to one or more locations of a disk.

When a flash card is connected into the expansion bus of a computer system, a software layer must ensure that data write commands from the operating system are interpreted to ensure that data is properly directed to a free memory location. A flash translation layer has been developed to interface between flash memory card erase blocks and the file system used by a PC operating system. One such FTL is described in U.S. Pat. No. 5,404,485 which issued in 1995. The FTL connects flash memory cards to the file system used by the operating system of a particular PC, not allowing more than one write without erase at the same address.

Conventionally, flash memory cards are block erased in the background during read write operations. Such background clean-up is non-optimal, in part because of the time consumed. In particular, read and write operations are delaved under the current conventional background erase clean-up paradigm, because the background clean-up operations take time which otherwise would be used in directly productive activities such as reading and writing data.

It is desirable to ensure that files deleted during normal computer operation are not unnecessarily preserved during file cleanup of a flash memory card array and medium. Unnecessary preservation of deleted files creates unnecessary administrative burdens which generate subsequent inefficiencies in computer operation and timely execution of instructions.

SUMMARY OF THE INVENTION

According to the present invention, a flash memory card array and medium is conventionally formatted. Then, a File Indication Map (FIM) is generated and stored on the flash medium as well as on the operating system of a computer system associated with the flash memory card array and medium. Next, the file system changes the File Indication Map at the operating system and writes the File Indication Map to a flash translation layer interfacing the computer system with the flash medium. The flash translation layer reads the original File Indication Map version from the flash memory card medium. The flash translation layer then compares the two versions of the FIM expressed in the FTL and makes blocks associated with the deleted file invalid. Further, according to the present invention, these blocks are rendered invalid in the block allocation map, preventing cleanup from moving deleted files for further storage.

DETAILED DESCRIPTION OF THE INVENTION

As is well-known, flash memory card arrays and media are organized in erase units, including full and transfer erase units. Such erase units are described in detail below. As part of a clean-up operation, the full and transfer erase units cooperate to ensure the removal of all valid data units from full erase unit to corresponding memory locations in transfer erase unit, prior to erasure of full erase unit. Clean-up is performed when predetermined conditions are met. For example, if there are no bad blocks, clean-up begins when there are only two free blocks available, beyond any free blocks required to account for flash translation layer structure blocks. If there are bad blocks, depending on the number of bad blocks, cleanup is undertaken much earlier, before the number of free blocks diminishes below a threshold which is a function of no less than twice the number of bad blocks and twice the number of flash translation structure blocks, plus a constant, which is preferably two. As is known, an erase unit includes an erase unit header; a block allocation map (BAM); a plurality of BAM indications of the status of particular blocks in full erase unit as valid, invalid, or free; and a plurality of memory locations for data storage in sectors as will be described in detail below in the text accompanying FIG. 1.

Valid blocks of a full erase unit are moved to corresponding free memory locations in a transfer unit. Thus, memory units of the transfer erase unit which were formerly designated "FREE" are now redesignated as "VALID," by the movement of the associated data in full erase unit to corresponding memory locations in transfer erase unit. Once all valid blocks of data in a full erase unit have been moved to corresponding locations in a transfer unit, the full erase unit is erased. Next, the erased full erase unit is redesignated as a new transfer unit. Additionally, the flash translation layer structures and tables are updated to reflect new address locations for information which has been relocated from the full erase unit to the transfer erase unit.

Figure 1:
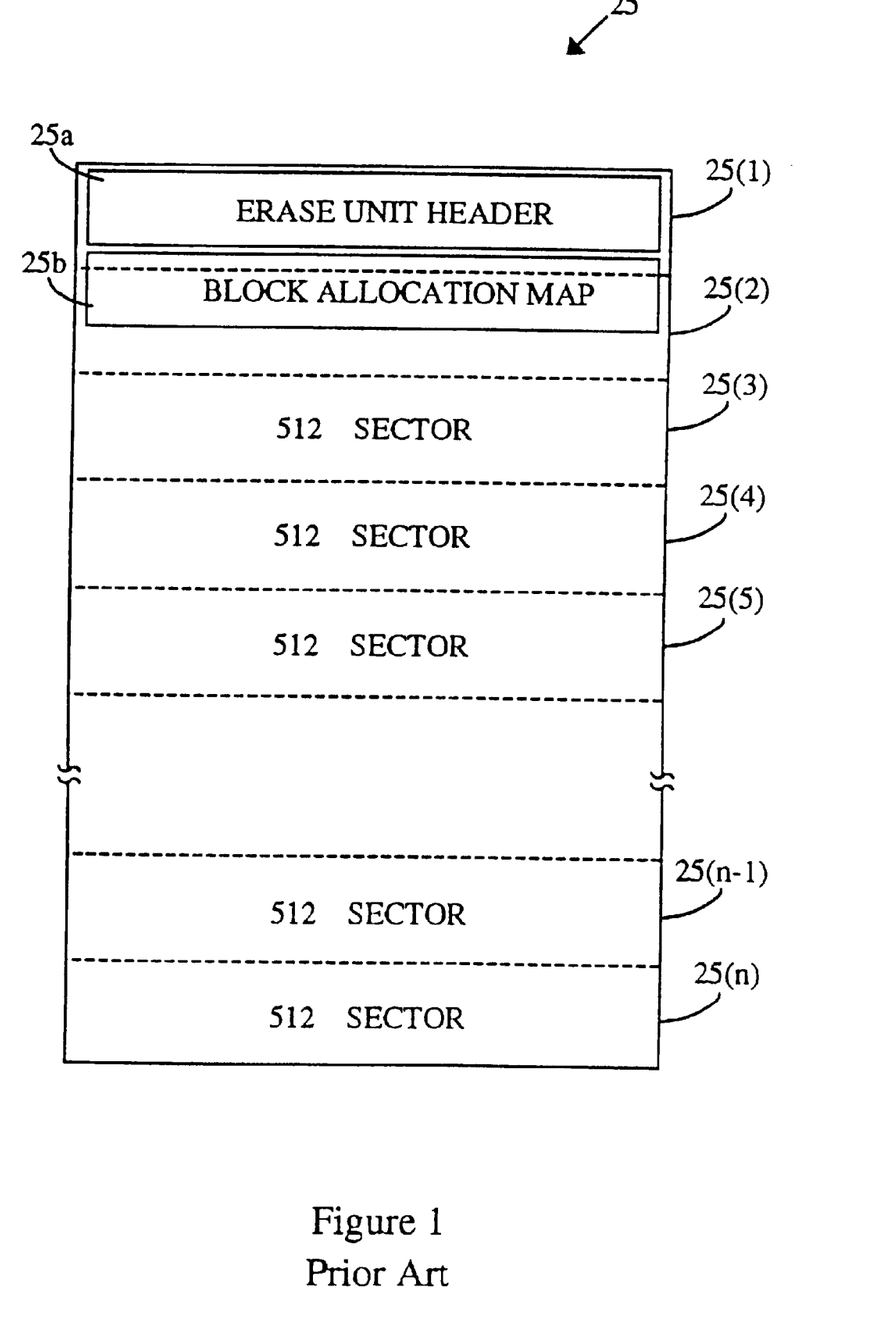
FIG. 1 is a detailed diagram of a typical erase unit according to the prior art, showing typical sector organization and the distribution the block allocation map over several sectors.

FIG. 1 is a detailed map or diagram of a typical erase unit 25 including an erase unit header 25a and a block allocation map 25b, according to the prior art. In particular, FIG. 1 shows a typical sector organization of erase unit 25. Erase unit 25 includes a plurality of sectors. 25(1)–25(n), which each may be 512 byte in size. Erase unit 25 further includes a distribution of block allocation map 25b over several 512 byte sectors. As shown in FIG. 1, erase unit header is located in first 512 byte sector 25(1). Block allocation map 25b is located in both first and second 512 byte sectors 25(1) and 25(2). Erase unit header 25a includes a count of the number of erase units in a block of memory subject to memory management. Erase unit header 25a further includes an indication of the size of the particular erase unit. Additionally, erase unit header 25a includes an indication of the size of the sectors in the erase unit.

Figure 2:
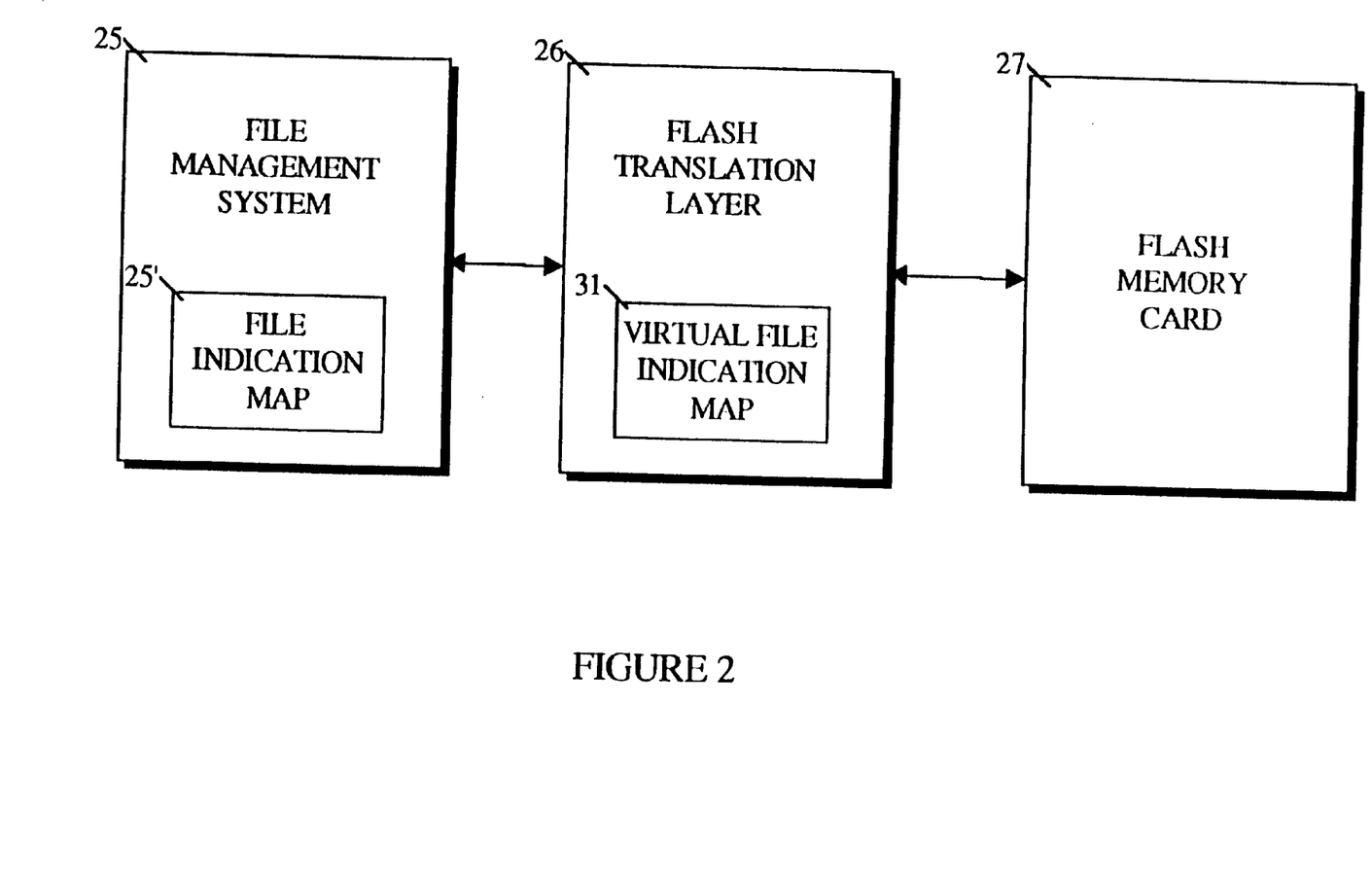
FIG. 2 is a block diagram showing the relationship between a PC operating system file management system and a flash medium in terms of a flash translation layer, using, first and second File Indication Maps respectfully held in the operating system of a file management system and in a flash translation layer.
Figure 4:
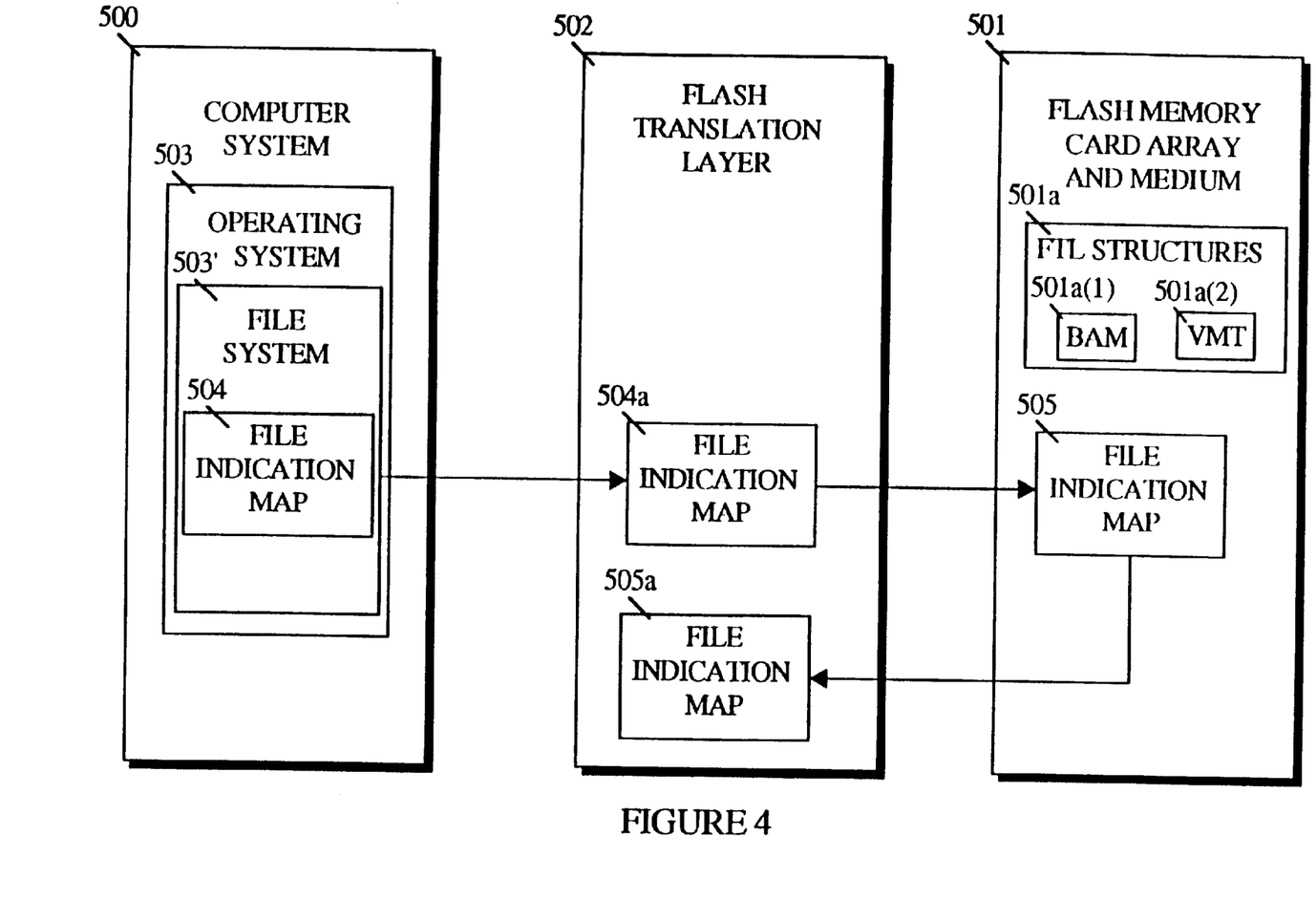
FIG. 4 is a block diagram of a computer system and a flash memory card array and medium interfaced with a flash translation layer, showing the multiplication scheme of a File Indication Map according to one embodiment of the present invention.

FIG. 2 is a block diagram showing the relationship between an operating system file management system 25 and a flash medium 27 in terms of a flash translation layer 26, using first and second File Indication Maps 25' and 31, respectively held in the operating system of file manag 25 and in flash translation layer 26. A well-known flash translation layer is disclosed to interface between flash memory card erase blocks and the file system used by a PC operating system. This is described in U.S. Pat. No. 5,404,485 issued in 1995, which is hereby incorporated in its entirety by reference and made a part hereof. The FTL connects flash memory card 27 to file management system 25 used by operating system 503 (FIG. 4) of personal computing system 500 (FIG. 4). According to an embodiment of the present invention, non-tabular, distributed indications or pointers are used to associate files with sectors in flash memory.

In operation, when the operating system reads or writes to or from flash memory medium 27, flash translation layer 26 translates the addresses of flash memory medium 27 to addresses used by the operating system file management system 25. Thus, a particular location of File Indication Map 25' contains a reference to a corresponding location in File Indication Map 31, which in turn can refer to one or more locations in flash memory medium 27. Thus, when the key generated is stored by operating system 503 (FIG. 4) on flash memory card 27, the operating system directs storage to a location in File Indication Map. The actual storage will however be directed to the locations on flash memory card which are established in virtual File Indication Map 31, according to the reference linkage provided by File Indication Map 25'. Thus, as per the former example, ultimate storage of the key would be to one or more flash memory card locations.

Cleanup is undertaken responsive to a determination as to whether there are any bad blocks. If not, the threshold, FreeTHold, is set equal to a value of two (2). However, if there are bad blocks, the number of bad blocks is determined, and the threshold at which cleanup is to be undertaken equals the value of two (2) plus twice the number of bad blocks, plus twice the number of flash translation structure blocks. In other words, if the number of free blocks left available in an erase unit is less than the indicated threshold, then cleanup is undertaken. With no bad blocks, only two free blocks need to be available, and cleanup can be delayed until only two free blocks are left. Two blocks are required as a minimum, because one block needs to be reserved for the virtual map page and one needs to be reserved for data transferred to the transfer erase unit. However, if there are bad blocks present within the particular erase unit, then cleanup must begin much earlier, i.e., at least two free blocks earlier for each bad block. Thus, for one bad block, the threshold at which cleanup is required occurs when there are four free blocks left within the erase unit. According to the present invention, this number is increased by twice the number of flash translation structure blocks. Accordingly, assuming one flash translation structure block and one bad block exists, then cleanup must begin at a threshold of 6 free blocks. The first two are reserved for the data transferred and for the virtual map page. The next two are reserved to accommodate bad blocks. The final two of the six total are required for the flash translation structure block.

Figure 3:
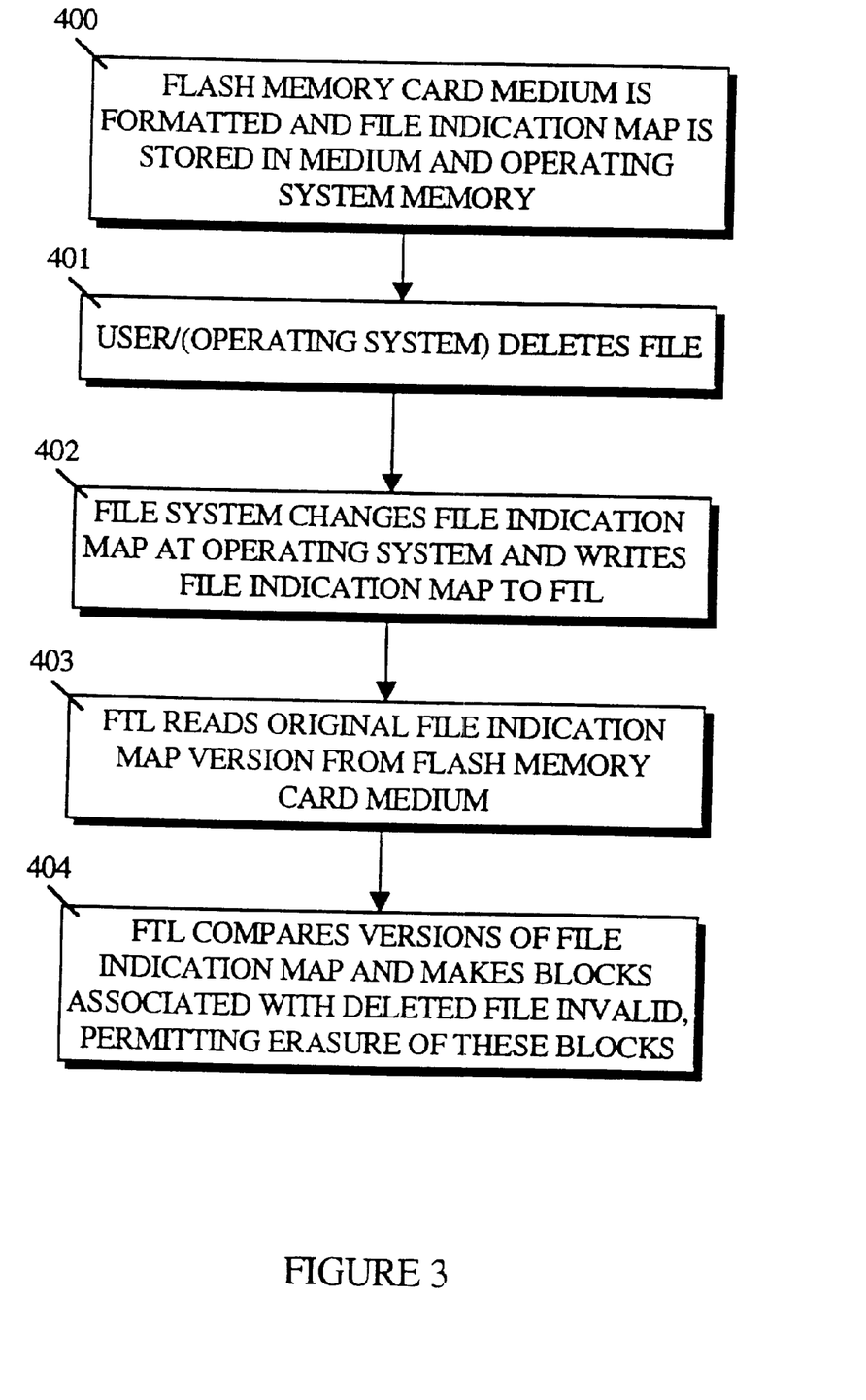
FIG. 3 is a flow chart of a method according to the present invention, showing redesignation of deleted file memory locations are invalid, permitting an end to any preservation of the deleted file information during erase unit transmittal of valid data to a transfer erase unit.

FIG. 3 is a flow chart of a method according to the present invention, showing redesignation of deleted file memory locations are invalid, permitting an end to any preservation of the deleted file information during erase unit transmittal of valid data to a transfer erase unit. In particular, according to the present invention, a selected flash memory card medium is formatted and an associated File Indication Map is stored 400 in the flash medium at a particular memory location as well as in operating system memory. Next, a particular file is deleted 401 by action of a user acting through the operating system. The file system working with the operating system next changes 402 the File Indication Map at the operating system and writes the File Indication Map to the file transfer layer. Next, the file transfer layer reads 403 the original FIM version from flash memory. Then, the file transfer layer compares 404 the versions of the FIM it has resident and makes the blocks associated with each deleted file invalid in the block allocation map. This making invalid in the block allocation map of deleted files, means that when blocks are moved to a transfer erase unit during cleanup, the blocks containing deleted files will not be moved. Instead, they are left behind to face erasure, when the full or fuller erase unit is in fact erased, after the valid files thereon have been moved to the targeted transfer erase unit.

FIG. 4 is a block diagram showing the relationship between a computer system 500 and a flash memory card array and medium 501 in terms of a flash translation layer 502. Computer system 500 includes an operating system 503 which in turn includes a File Indication Map 504. Flash memory card array and medium 501 includes a File Indication Map 505. File Indication Maps 504 and 505 are related to each other and may at points of time be similar or the same. Flash translation layer 502 includes first and second File Indication Maps respectively 504a and 505a. First File Indication Map 504a is derived from File Indication Map 504, and second File Indication Map 505a is derivative of File Indication Map 505. When a file is deleted by action of operating system 503, this deletion is reflected in File Indication Map 504, and in derivative File Indication Map 504a. When the deletion is reflected in derivative File Indication Map 504a, this is reflected in a difference which will be detected in a comparison between respective File Indication Maps 504a and 505a. As a result of any such difference being detected, a block allocation map is modified to reflect invalidity of the particular file. Thus, during cleanup, the deleted file will not be transferred and preserved to live on at another location. Instead, the file will be left behind with other invalid files to be erased. A well-known flash translation layer is disclosed to interface between flash memory card erase blocks and the file system used by a PC operating system. This is described in U.S. Pat. No. 5,404,485 issued in 1995, which is hereby incorporated in its entirety by reference and made a part hereof. FIG. 4 is a block diagram of a computer system 500 and a flash memory card array and medium 501 interfaced with a flash translation layer 502. Computer system 500 includes an operating system 503 which in turn includes a file system 503' which in turn includes a File Indication Map 504. Flash memory card array and medium 501 includes flash translation layer structures 501a including block allocation map 501a(1) and virtual map table 501a(2). Flash memory card array and medium 501 further includes File Indication Map 505 which is derived, as will be seen, from File Indication Map 504a.

According to the present invention, File Indication Map 504a in FIG. 4 is written over File Indication Map 505, thus replacing former File Indication Map 505. According to one embodiment of the present invention, the replacement is made without a comparison between File Indication Map 504a and File Indication Map 505 for possible file deletions in File Indication Map 504a over a version of files indicated in File Indication Map 505. According to this embodiment, that determination is made by comparing File Indication Map 504a with File Indication Map 505a. According, to another embodiment of the present invention, the replacement is made after a comparison for the indicated purpose between File Indication Map 504a and FieIndication Map 505.

FIG. 4 particularly shows the multiplication scheme of a File Indication Map 504 according to one embodiment of the present invention. Originally file system 503' directs the establishment of a File Indication Map 504a in flash translation layer 502. When file system 503' in FIG. 4 modifies File Indication Map 504a it reads table 504a, modifies it, and writes it back in modified form in flash translation layer 502. Accordingly, file system 503' includes a version of File Indication Map 504. According to the present invention, flash translation layer 502 stores File Indication Map 504a at a location in flash memory card array and medium 501, as Map 505. Further, flash translation layer 502, according to one embodiment of the present invention, stores a copy of File Indication Map 5o5 in flash translation layer 502, as File Indication Map 505a. According to the present invention, File Indication Maps 504a and 505a are compared to determine whether the files indicated in table 505a and 504a are the same. Simply stated, if file system 503' has modified File Indication Map 504a by deleting a file in the table which was formerly there, as evidenced by a reference to the file in another version of an old or earlier File Indication Map, for example either File Indication Map 505 or File Indication Map 505a, then the deletion of the file is evidenced by the noted discrepancy, i.e., the absence of a file reference in File Indication Map 504a which is made in either File Indication Map 505 or File Indication Map 505a. If there is a discrepancy in files referenced in File Indication Map 504a and either of File Indication Maps 505 or 505a, then, according to an embodiment of the present invention, block allocation map 501a(1) is updated to delete the association between the physical location at which the identified deleted file was stored and the virtual address formerly connected with the particular physical location. The block allocation map is a physical to virtual map which associates particular physical sectors of the flash medium with a related virtual address, provided that a relationship exists. If a relationship exists, the sector of the flash memory affected is no longer free, but valid. After a file is deleted, the sector of flash memory referred to in the block allocation map is indicated as other than valid, preventing preservation by transfer out to a transfer unit prior to erase operation. Since no copy of the data is transferred out, the sector and its data are completely erased during erase operation. According to another embodiment of the present invention, when there is a file deletion noted by comparison with File Indication Map 504a, virtual map table 501a(2) is modified to delete an association established between virtual and logical addresses expressed in the virtual map table, which corresponds to a physical address containing data to be erased without preservation on a transfer erase unit.

Figure 5:
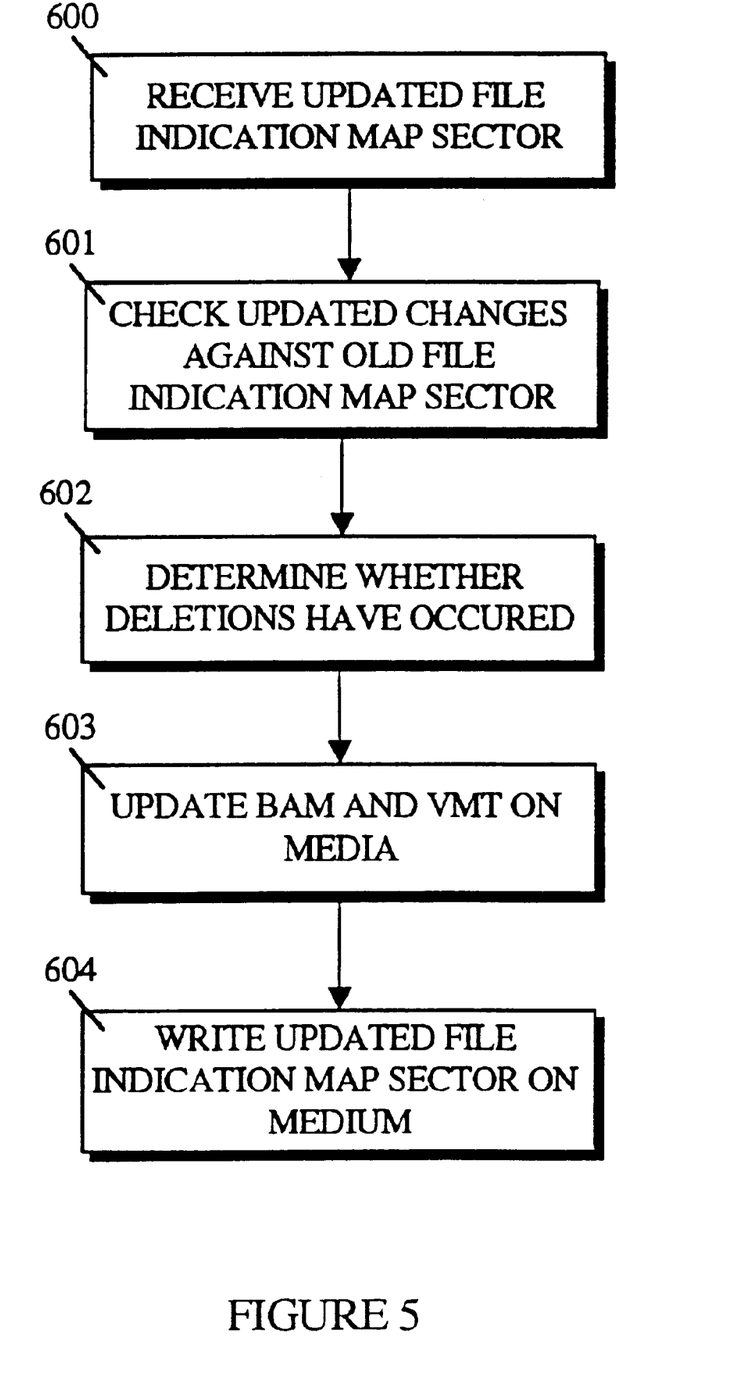
FIG. 5 is a flow chart of a method according to the present invention in which the flash translation layer receives an updated File Indication Map sector, a check is made for updated changes in the updated File Indication Map sector against the corresponding old File Indication Map sector, a determination is made whether one or more file deletions have occurred; the block allocation map and the virtual map table are updated on the flash memory card array and medium, and the updated File Indication Map sector is written in the flash memory card array and medium.

FIG. 5 is a flow chart of a method according to the present invention in which the flash translation layer receives 600 an updated File Indication Map sector. According to the method of the present invention, a check is made 601 for updated changes in the updated File Indication Map sector against the corresponding old File Indication Map sector. Further, a determination is made 602 whether one or more file deletions have occurred. Then, according to one embodiment, block allocation map 501a(1) and virtual map table 501a(2) are updated on flash memory card array and medium 501. According to another embodiment, only block allocation map 501a(1) is updated. Finally, the updated File Indication Map sector is written in flash memory card array and medium 501. According to one embodiment of the present invention, a copy of the updated File Indication Map sector is made or stored in flash translation layer separately from File Indication Map 504a. This provides a status record of a former File Indication Map for comparison agyainst subsequent modifications of File Indication Map 504a.

According to the present invention, comparisons to determine file deletion are made between File Indication Map 504a and File Indication Map 505 or 505a. The comparison between File Indication Maps 504a and 505a is speedy, because tables in the flash translation layer are being compared without reference to storage of a File Indication Map 505 in flash memory card array and medium 501.

What is claimed is:

1. A flash memory system, comprising:
   a flash memory having a plurality of sectors, said flash memory storing status information indicating the status of said sectors;
   storage, residing within said flash memory, for storing a set of file information, said file information including mapping information, in the form of a file indication map residing in a file system used by an operating system controlling said storing of the file information, for mapping a file to one or more of said sectors, wherein a copy of the file indication map residing in the file system used by the operating system is made in a flash translation layer separately from said file indication map residing in the file system, thereby providing a status record of a former file indication map for comparison against subsequent modifications of the file indication map residing in the file system used by the operating system; and an agent for receiving a set of updated file information from said file system, said agent determining whether there is a difference between said updated file information and said file information, and if so, altering the status information for selected sectors of said flash memory to reflect said difference.

2. The system of claim 1 including a flash translation layer for interfacing said flash memory with said file system.

3. The system of claim 2 wherein said flash translation layer includes said agent.

4. The system of claim 2 wherein the flash translation layer includes the storage for storing said file information.

5. The system of claim 1, wherein said status information includes a block allocation map.

6. The system of claim 5, wherein if a discrepancy is noted between the mapping information residing within the flash memory and said file indication map, updating the block allocation map to delete the association between a physical location at which the identified deleted file was stored and a virtual address formerly connected with the particular physical location, said particular physical location associated with physical sectors of the flash medium with a related virtual address.

7. The system of claim 6, wherein after a file is deleted, the sector of flash memory referred to in the block allocation map is indicated as other than valid, preventing preservation by transfer out to a transfer unit prior to erase, thereby resulting in complete erasure of said sector during the erase operation.

8. The system of claim 7, wherein determination is made by comparing the mapping information residing within the flash memory and said file information map, and replacement is made after said comparison.

9. The system of claim 1, wherein said status information includes a virtual map table.

10. The system of claim 1, wherein determination is made by comparing the mapping information residing within the flash memory and said file indication map, and replacement is made after said comparison.

11. Method of storing data in a flash memory system, the method comprising:

providing a flash memory having a plurality of sectors;

storing status information in the flash memory indicating the status of said plurality of sectors;

storing a set of file information on said flash memory in a storage location residing within said flash memory, including mapping information, in the form of a file indication map residing in a file system used by an operating system controlling said storing of the file information, for mapping a file to one or more of said sectors; and receiving a set of updated file information from said file system, and determining whether there is a difference between said updated file information and said file information, and if so, altering the status information for selected sectors of said flash memory to reflect said difference, wherein a copy of the file indication map residing in the file system used by the operating system is made in a flash translation layer separately from said file indication map residing in the file system, thereby providing a status record of a former file indicator map for comparison against subsequent modifications of the file indication map residing in the file system used by the operating system.

12. The method of claim 11 including using a flash translation layer for interfacing said flash memory with said file system.

13. The method of claim 12 wherein said flash translation layer includes an agent for receiving a set of updated file information from said file system, said agent determining whether there is a difference between said updated file information and said file information, and if so, altering the status information for selected sectors of said flash memory to reflect said difference.

14. The method of claim 12 wherein the flash translation layer includes the storage for storing said file information.

15. The method of claim 11, wherein said status information includes a block allocation map.

16. The method of claim 15, wherein if a discrepancy is noted between the mapping information residing within the flash memory and said file indicatioh map, updating the block allocation map to delete the association between a physical location at which the identified deleted file was stored and a virtual address formerly connected with the particular physical location, said particular physical location associated with physical sectors of the flash medium with a related virtual address.

17. The method of claim 16, wherein after a file is deleted, the sector of flash memory referred to in the block allocation map is indicated as other than valid, preventing preservation by transfer out to a transfer unit prior to erase, thereby resulting in complete erasure of said sector during the erase operation.

18. The method of claim 17, wherein determination is made by comparing the mapping information residing within the flash memory and said file indication, and replacement is made after said comparison.

19. The method of claim 11, wherein said status information includes a virtual map table.

20. The method of claim 11, wherein determination is made by comparing the mapping information residing within the flash memory and said file indication map, and replacement is made after said comparison.

21. Method of storing data in a flash memory system, the method comprising:

providing a flash memory having a plurality of sectors;

storing status information, including a block allocation map, in the flash memory indicating the status of said plurality of sectors;

storing a set of file information on said flash memory in a storage location residing within said flash memory, including mapping information, in the form of a file indication map residing in a file system used by an operating system controlling said storing of the file information, for mapping a file to one or more of said sectors; and receiving a set of updated file information from said file system, and determining whether there is a difference between said updated file information and said file information, and if so, altering the status information for selected sectors of said flash memory to reflect said difference, wherein if a discrepancy is noted between the mapping information residing within the flash memory and said file indication map, updating the block allocation map to delete the association between a physical location at which the identified deleted file was stored and a virtual address formerly connected with the particular physical location, said particular physical location associated with physical sectors of the flash medium with a related virtual address, after a file is deleted, the sector of flash memory referred to in the block allocation map is indicated as other than valid, preventing preservation by transfer out to a transfer unit prior to erase, thereby resulting in complete erasure of said sector during the erase operation, said determination made by comparing the mapping information residing within the flash memory and said file indication map, and replacement is made after said comparison, and a copy of the file indication map residing in the file system used by the operating system is made in a flash translation layer separately from said file indication map residing in the file syst m,thereby providing a status record of a former file indication map for comparison against subsequent modifications of the file indication map residing in the file system used by the operating system.

22. A flash memory system, comprising:

a flash memory having a plurality of sectors, said flash memory storing status information indicating the status of said sectors, said status information including a block allocation map;

storage, residing within said flash memory, for storing a set of file information, said file information including mapping information, in the form of a file indication map residing in a file system used by an operating system controlling said storing of the file information, for mapping a file to one or more of said sectors; and an agent for receiving a set of updated file information from said file system, said agent determining whether there is a difference between said updated file information and said file information by comparing the mapping information residing within the flash memory and said file indication map, and if so, altering the status information for selected sectors of said flash memory to reflect said difference, wherein if a discrepancy is noted between the mapping information residing within the flash memory and said file indication map, the block allocation map is updated to delete the association between a physical location at which the identified deleted file was stored and a virtual address formerly connected with the particular physical location, said particular physical location associated with physical sectors of the flash medium with a related virtual address, after a file is deleted, the sector of flash memory referred to in the block allocation map is indicated as other than valid, preventing preservation by transfer out to a transfer unit prior to erase, thereby resulting in complete erasure of said sector during the erase operation, replacement is made after said comparison, and a copy of the file indication map residing in the file system used by the operating system is made in a flash translation layer separately from said file indication map residing in the file system, thereby providing a status record of a former file indication map for comparison against subsequent modifications of the file indication map residing in the file system used by the operating system.

* * * * *